United States Patent
Mevius et al.

(10) Patent No.: US 9,297,465 B2
(45) Date of Patent: Mar. 29, 2016

(54) PILOT-OPERATED REGULATOR WITH BALANCED PORT

(71) Applicant: EMERSON PROCESS MANAGEMENT REGULATOR TECHNOLOGIES, INC., McKinney, TX (US)

(72) Inventors: Jason Scott Mevius, McKinney, TX (US); James Chester Hawkins, Allen, TX (US); Paul Richard Anderson, Zimmerman, MN (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 86 days.

(21) Appl. No.: 13/633,083

(22) Filed: Oct. 1, 2012

(65) Prior Publication Data
US 2014/0090724 A1    Apr. 3, 2014

(51) Int. Cl.
| | |
|---|---|
| F16K 31/12 | (2006.01) |
| F16K 17/00 | (2006.01) |
| F16K 31/165 | (2006.01) |
| G05D 16/06 | (2006.01) |
| F16K 17/04 | (2006.01) |
| F16K 17/32 | (2006.01) |
| G05D 16/16 | (2006.01) |

(52) U.S. Cl.
CPC ............... *F16K 17/00* (2013.01); *F16K 17/042* (2013.01); *F16K 17/32* (2013.01); *F16K 31/165* (2013.01); *G05D 16/0694* (2013.01);
(Continued)

(58) Field of Classification Search
CPC ...... G05D 6/16; G05D 6/163; Y10T 137/261; Y10T 137/7801; Y10T 137/7831; Y10T 137/7762

USPC ............................................. 137/488; 251/50
See application file for complete search history.

(56) References Cited

U.S. PATENT DOCUMENTS

| | | | | |
|---|---|---|---|---|
| 2,273,111 A | * | 2/1942 | Kindl | 137/489.5 |
| 2,624,980 A | * | 1/1953 | Hughes | 137/492.5 |

(Continued)

FOREIGN PATENT DOCUMENTS

WO    WO-97/17641 A1    5/1997

OTHER PUBLICATIONS

International Search Report for PCT/US2013/062794, mailed Jan. 8, 2014.
(Continued)

*Primary Examiner* — R. K. Arundale
(74) *Attorney, Agent, or Firm* — Marshall, Gerstein & Borun LLP (57) ABSTRACT

A fluid regulating device includes a regulator valve, an actuator and a pilot regulator valve assembly. The pilot regulator valve assembly provides a pressure load to a surface of a diaphragm of the actuator in response to changes in downstream pressure being applied to the opposite surface of the diaphragm. An upper cavity of the pilot regulator valve assembly is in fluid communication with a control cavity of the actuator, allowing both the actuator diaphragm and the pilot regulator valve assembly diaphragm to simultaneously sense pressure variations within the cavities. As the downstream pressure varies, the diaphragms of both the actuator and the pilot regulator valve assembly displace to regulate the downstream pressure and the pilot regulator valve assembly maintains a load pressure. The regulator further includes a balanced regulator valve applying a balancing force to offset a force of upstream pressure on a balanced valve plug.

15 Claims, 3 Drawing Sheets

(52) U.S. Cl.
CPC ........ *G05D 16/163* (2013.01); *Y10T 137/7762* (2015.04); *Y10T 137/7801* (2015.04); *Y10T 137/7831* (2015.04)

(56) References Cited

U.S. PATENT DOCUMENTS

| | | | | |
|---|---|---|---|---|
| 3,722,536 | A | * | 3/1973 | Hill et al. ................. 137/505.46 |
| 6,192,912 | B1 | * | 2/2001 | Butler et al. ............... 137/15.19 |
| 6,354,319 | B1 | * | 3/2002 | Mooney .......................... 137/14 |
| 8,240,327 | B2 | * | 8/2012 | Hawkins et al. ........... 137/489.5 |
| 8,281,803 | B2 | * | 10/2012 | Mevius et al. ........... 137/505.46 |
| 8,286,660 | B2 | * | 10/2012 | Mevius et al. ............. 137/484.8 |
| 2009/0261281 | A1 | | 10/2009 | Mevius et al. |
| 2012/0111425 | A1 | | 5/2012 | Hawkins et al. |

OTHER PUBLICATIONS

Written Opinion for PCT/US2013/062794, mailed Jan. 8, 2014.

* cited by examiner

PILOT-OPERATED REGULATOR WITH BALANCED PORT

FIELD OF THE DISCLOSURE

The present disclosure relates to fluid control devices and, more particularly, to diaphragm-based fluid regulators.

BACKGROUND OF THE DISCLOSURE

Pressure regulating valves are used in myriad industrial and residential applications for controlling the downstream pressure of a fluid. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves can be categorized as either balanced or unbalanced, and different valves are used in different global marketplaces due to variations in emission standards and methods of monitoring the amount of gas supplied.

Figure 1:
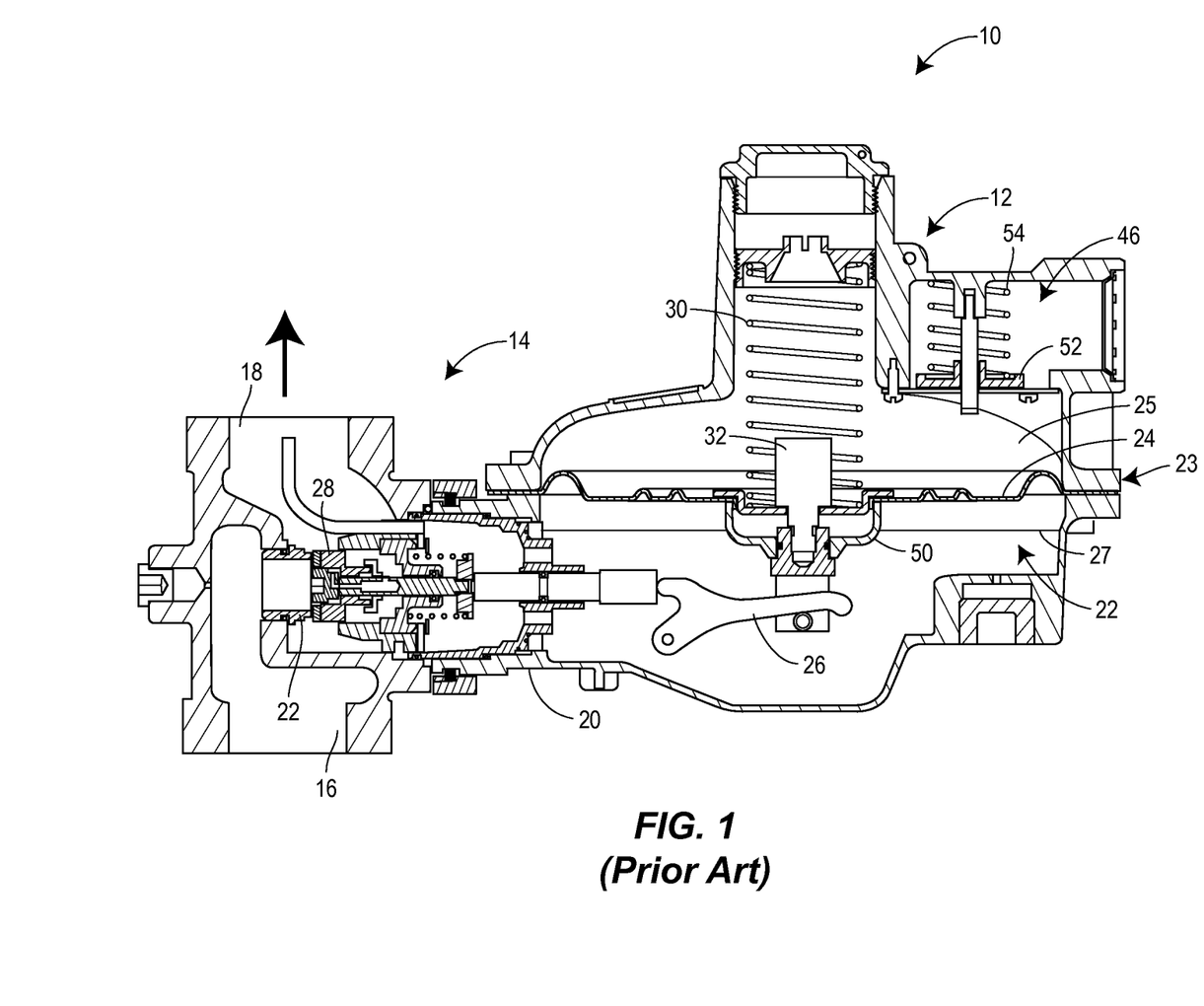
FIG. 1 is a side cross-sectional view of a conventional balanced port gas regulator.

For example, a conventional balanced pressure regulator valve that is commonly used in Europe is illustrated in FIG. 1. The conventional gas regulator 10 comprises an actuator 12 and a balanced pressure regulator valve 14. The regulator valve 14 defines an inlet 16, an outlet 18, and a valve port 22 disposed between the inlet 16 and the outlet 18. Gas must pass through the valve port 22 to travel between the inlet 16 and the outlet 18 of the regulator valve 14. The actuator 12 is coupled to the regulator valve 14 to ensure that the pressure at the outlet 18 of the regulator valve 14, i.e., the outlet pressure, is in accordance with a desired outlet or control pressure. The actuator 12 includes a control assembly 22 for regulating the outlet pressure of the regulator valve 14 based on sensed outlet pressure. Specifically, the control assembly 22 includes a diaphragm 24, a connecting post 32, and a control arm 26 having a valve plug 28. The diaphragm 24 divides a housing 23 of the actuator 12 into an atmospheric cavity 25 and a control pressure cavity 27. The control pressure cavity 27 is in fluid communication with the outlet 18 of the regulator valve 14 such that a bottom side of the diaphragm 24 senses the outlet pressure and responds to move the valve plug 28 between open and closed positions. The control assembly 22 further includes a control spring 30 disposed in the atmospheric cavity 25 and in engagement with a top-side of the diaphragm 24 to offset the outlet pressure sensed by the diaphragm 24 in the control pressure cavity 27. Accordingly, the desired outlet pressure, which may also be referred to as the control pressure, is set by the selection of the control spring 30.

One problem with the conventional regulator 10 having the outlet pressure controlled and set by the control spring 30, however, is that as the valve plug 28 opens or moves away from the valve port 22 to open the valve 14, the control spring 30 expands or elongates and loses force. As the force is reduced, outlet pressure decreases, resulting in a rated capacity reduction. In other words, the control spring 30 inherently generates less force as it expands towards an uncompressed length when displacing the control arm 26 to open the valve 14. Additionally, as the control spring 30 expands, the diaphragm 24 deforms, increasing the area of the diaphragm 24. The decreased force supplied by the control spring 30 and the increased area of the diaphragm 24 combine such that the force provided by the control spring 30 cannot adequately balance the force generated by the diaphragm 24. As a result, the diaphragm 24 rises and the outlet control pressure falls below the desired control pressure. This phenomenon is known as "droop." When "droop" occurs, the outlet pressure decreases below its set control pressure, and the amount of fluid transferred while maintaining the outlet pressure range, also known as the rated flow value, also decreases.

Figure 2:
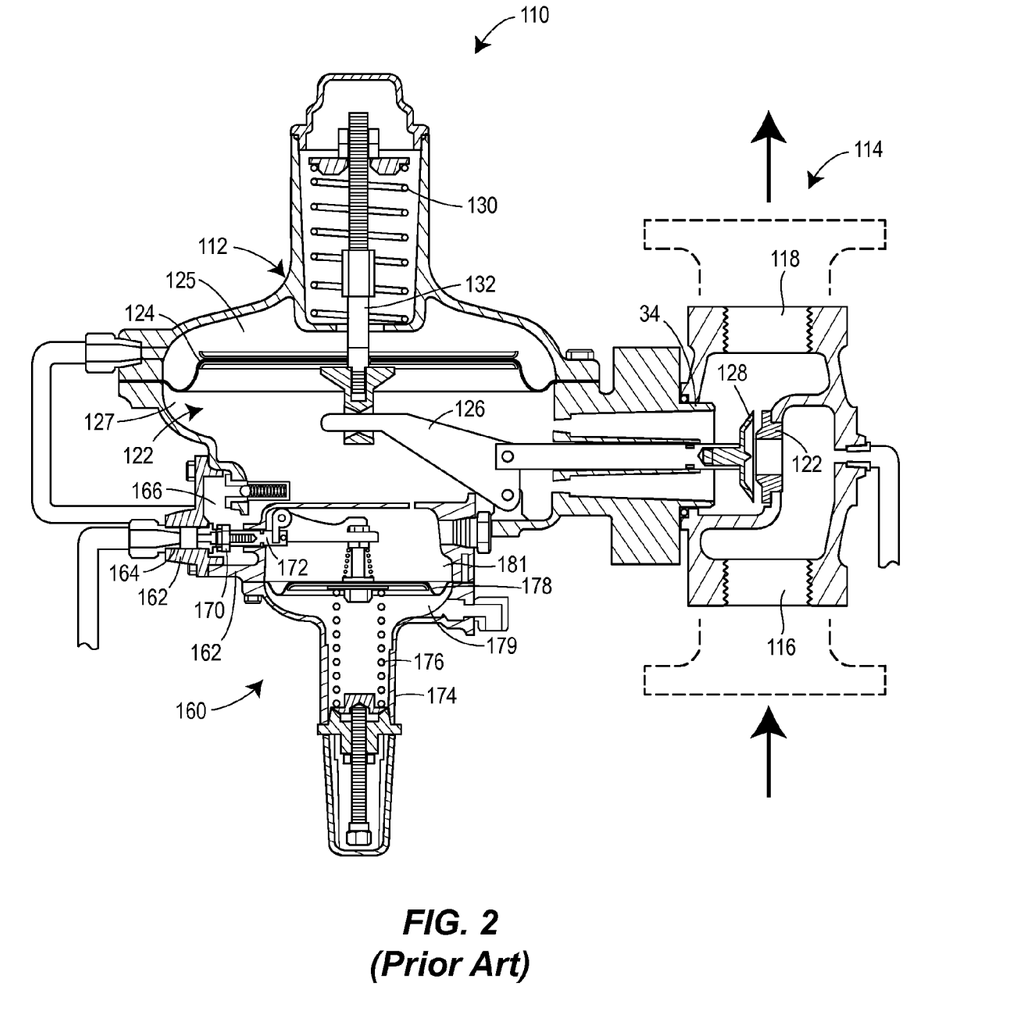
FIG. 2 is a side cross-sectional view of a conventional pilot-operated unbalanced port gas regulator.

In the United States, attempts to address the effects of "droop" include using a pilot regulator valve to control and adjust the delivery of loading pressure above the diaphragm. Such pilot regulators are typically limited to use with unbalanced regulator valves however, and in general, supply and control the amount of loading pressure applied to the actuator diaphragm during operation of the regulator. For example, FIG. 2 depicts a conventional regulator 110 for the United States' market having an unbalanced regulator valve 114, an actuator 112 and a pilot regulator 160 operatively connected to both the regulator valve 114 and the actuator 112. More specifically, the valve 112 defines an inlet 116, an outlet 118, and a valve port 122 disposed between the inlet 116 and the outlet 118. Gas must pass through the valve port 122 to travel between the inlet 116 and the outlet 118 of the regulator valve 114. The actuator 112 is coupled to the regulator valve 114 to ensure that the pressure at the outlet 118 of the regulator valve 114, i.e., the outlet pressure, is in accordance with a desired outlet or control pressure. The actuator 112 includes a control assembly 122 having a diaphragm 124, a connecting stem 132, and a control arm 126 having a valve plug 128. The diaphragm 124 senses the outlet pressure of the regulator valve 114 and provides a response to move the valve plug 128 to open and close the regulator valve 114. The diaphragm 124 divides the actuator housing into a loading pressure cavity 125 and a control pressure cavity 127.

The regulator 110 in FIG. 2 does not include a control spring in the loading cavity 125, as the regulator 10 in FIG. 1 does. Rather, the pilot regulator valve 160 is operatively connected to the actuator 112 to control and adjust the load or loading pressure delivered to the load pressure cavity 125. Moreover, the pilot regulator valve assembly 160 does this in response to changes in pressure in the control pressure cavity 127 of the actuator 112. More specifically, the pilot regulator valve assembly 160 includes a body 162 having an inlet 164, an outlet 166, and a valve port 168 disposed between the inlet 164 and the outlet 166. The inlet 164 is in fluid communication with the inlet 116 of the unbalanced regulator valve 114 and the outlet 166 is in fluid communication with the control pressure cavity 125 of the actuator 112. The pilot regulator valve assembly 160 further includes a bonnet 174 coupled to the body 162, a valve plug 170 disposed within the body 162, and a diaphragm 178 disposed within the bonnet 174. The diaphragm 178 divides the bonnet 174 into a first cavity 179 and a second cavity 181, wherein the second cavity 181 is operatively coupled to and in fluid communication with the control pressure cavity 127 of the actuator 112 and the first cavity 179 includes a pilot control spring 176. So configured, the pressure in the control pressure cavity 127 of the actuator 112 is equal to the pressure in the second cavity 181 of the pilot regulator valve assembly 160, while the pilot control spring 176 offsets or balances the position of the diaphragm 178. Changes to the control pressure sensed by the diaphragm 178 cause the valve plug 170 to move between a closed position and an open position, for example. Such a configuration allows the pilot regulator valve 160 to control and adjust the loading pressure delivered to the loading pressure chamber 125 of the actuator 112 by responding to minor changes in the control or outlet pressure within the control pressure cavity 127 of the actuator 112.

While the effects of "droop" are reduced for the unbalanced regulator valve 114 by using the pilot valve, the unbalanced valve 114 has several drawbacks. For example, unbalanced valves have difficulty withstanding high inlet pressures, and high fluid pressure acting on valve ports 122 with large valve orifices can crush the valve port. As a result, unbalanced valves are not ideal for high pressure, large orifice applications. In addition, unbalanced valves suffer from an undesirable effect known as inlet pressure sensitivity. Inlet pressure sensitivity is a phenomenon in which an unbalanced valve experiences an unintended increase in control pressure as inlet pressure increases.

In addition, different markets around the world have historically demanded different pressure regulating valves due to variations in emissions standards and methods of monitoring the amount of gas supplied to end users. For example, in the United States, meters typically only monitor the amount of pressure supplied, as such it is important to control the flow rate of pressure, and pilot-operated regulator valves are typically used to do the same. Not many balanced regulator valves, such as the valve depicted in FIG. 1, however, are used in the United States because balanced ports often clog the passageways through a throat in the valve, affecting and interfering with the operation of relief valves. Instead, unbalanced regulator valves, such as those operated by a pilot regulator valve and depicted in FIG. 2, are more commonly used in the United States.

In Europe, emissions standards have historically been higher than in the U.S., such that relief valves are not acceptable. As such, balanced ports are typically used because there is not a concern with any clogging of passageways affecting the operation of any relief valves exhausting excess gas into the atmosphere. However, the conventional balanced regulator valves used in Europe, such as the balanced pressure regulator valve depicted in FIG. 1, suffer from the problems of "droop," for example, as explained above.

SUMMARY

One aspect of the present disclosure provides a fluid regulating device, comprising a valve having a first inlet, a first outlet, and a first valve port disposed between the first inlet and the first outlet. The device further includes an actuator coupled to the valve. The actuator has a housing coupled to the valve, and a first valve plug disposed within the valve and adapted for displacement between a closed position engaging the first valve port and an open position disposed away from the first valve port. Moreover the actuator has a balancing diaphragm operatively connected to the first valve plug and having a first side in fluid communication with an inlet pressure at the inlet of the valve, wherein the inlet pressure applies a first force to the first valve plug in the direction of the open position, and the inlet pressure acts on the balancing diaphragm to apply a second force to the first valve plug in a direction of the closed position, the magnitude of the first and second forces being approximately equal, a first diaphragm disposed within the housing and dividing the housing into a loading pressure cavity and a control pressure cavity, the first diaphragm being operatively coupled to the first valve plug and the control pressure cavity being in fluid communication with first outlet of the valve. The device further includes a pilot regulator valve assembly coupled to the actuator. The pilot regulator valve assembly can have a valve body with a second inlet, a second outlet and a second valve port disposed between the second inlet and the second outlet, wherein the second inlet is in fluid communication with the first inlet, and the second outlet is in fluid communication with the loading pressure cavity of actuator housing. Moreover, the pilot regulator valve assembly can include a bonnet coupled to the body, a second valve plug disposed within the body and adapted for displacement between a closed position engaging the second valve port and an open position disposed away from the second valve port, a second diaphragm disposed within the bonnet and dividing the bonnet into an first cavity and a second cavity, the second diaphragm being operatively coupled to the second valve plug, and the second cavity in fluid communication with the control pressure cavity of the actuator, such that a first surface of the first diaphragm of the actuator is in fluid communication with a first surface of the second diaphragm of the pilot regulator valve assembly, and a control spring disposed within the first cavity of the bonnet and engaging a second surface of the second diaphragm. So configured, the second diaphragm and the control spring are configured to cause the second valve plug to move toward the open position when pressure in the second cavity of the bonnet decreases and to cause the second valve plug to move toward the closed position when the pressure in the second cavity of the bonnet increases to maintain a pressure within the load pressure cavity of the actuator that is approximately equal to a predetermined load pressure. Moreover, the actuator is configured to cause the first valve plug to move toward the open position when pressure in the load pressure cavity increases and to cause the first valve plug to move toward its closed position when the pressure in the load pressure cavity decreases to maintain pressure at the first outlet approximately equal to a predetermined setpoint pressure.

While the disclosure is susceptible to various modifications and alternative constructions, certain illustrative embodiments thereof have been shown in the drawings and will be described in detail below. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

Figure 3:
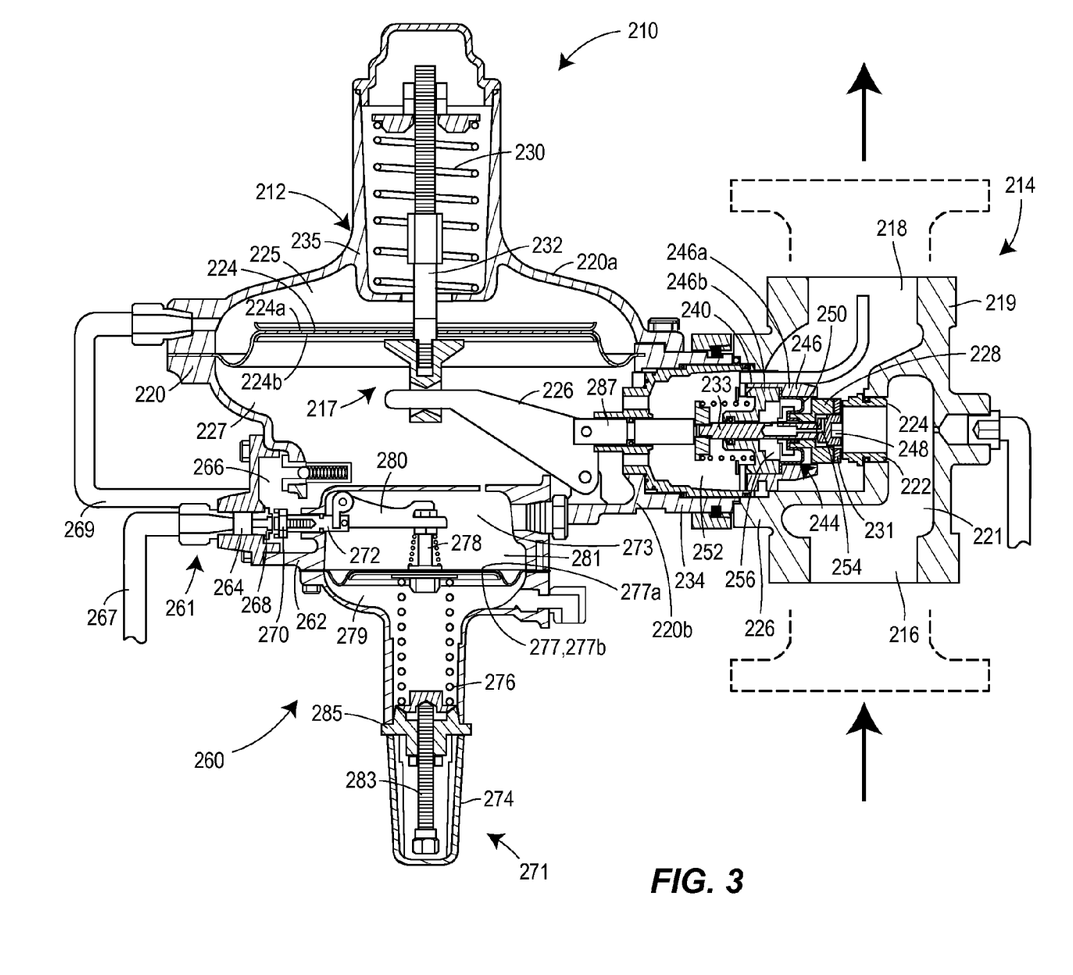
FIG. 3 is side cross-sectional view of a pilot-operated balanced port gas regulator constructed in accordance with the teachings of the present disclosure.

Referring now to FIG. 3, a gas regulator is generally referred to by reference numeral 210. The gas regulator 210 generally comprises an actuator 212 and a regulator valve 214. The regulator valve 214 includes an inlet 216 for receiving gas from a gas distribution system, for example, and an outlet 218 for delivering gas to a facility having one or more appliances, for example. The actuator 212 is coupled to the regulator valve 214 and includes a control assembly 217 having a control element, such as a valve plug 228. During a first or normal operational mode, the control assembly 217 senses the pressure at the outlet 218 of the regulator valve 214, i.e., the outlet pressure, and controls a position of the valve plug 228 such that the outlet pressure approximately equals a predetermined setpoint or control pressure.

The balanced pressure regulator valve 214 includes a body 219 having a passage 221 that fluidly connects the fluid inlet 216 with the fluid outlet 218. The passage 221 includes a throat 224 in which a valve port 222 is disposed. Gas must travel through the valve port 222 to travel between the inlet 216 and the outlet 218 of the regulator valve 214. The valve port 222 is removable from the regulator valve 214 such that it may be replaced with a different valve port 222 having a bore of a different diameter or configuration to tailor operational and flow characteristics of the regulator valve 214 to a specific application.

A load spring 240 is connected to a valve stem 223 that is operatively attached to the balanced valve plug 228. The plug 228 interacts with the valve port 222 to control fluid flow between the inlet 216 and the outlet 218. More specifically, the valve plug 228 can include a circumferential recess into which a rubber disc 231 is disposed. The disc 231 of the valve plug 228 contacts the valve port 222 to achieve alignment and sealing engagement between the valve plug 228 and the valve port 222 for closing the valve 214.

The present version of the valve plug 228 further includes a balanced plug assembly 244 having a sleeve 246 and a retainer 248. The sleeve 246 has a hollow bore that helps retain and guide the valve plug 228 as the valve plug 228 reciprocates within the valve body 219 to control fluid flow. The sleeve 246 may have an angled outer surface to enhance clearance within the valve body 219 and/or enhance assembly of the pressure regulator 214.

A diaphragm 250 is connected between the valve plug 228 and the sleeve 246. In this embodiment, the sleeve 246 includes a first sleeve part 246a and a second sleeve part 246b between which an outer peripheral portion of the diaphragm 250 is sandwiched.

The retainer 248 attaches the plug 228 to the stem 223. The retainer 248 may include a fastener, such as a threaded bolt that is operatively attached to a portion of the valve stem 223. One or more balancing passages or channels 254 are disposed in the plug 228 and fluidly connect passage 221 of the valve body 214 with a balancing chamber 256 defined between the second sleeve part 246b of the sleeve 246 and the diaphragm 250. So configured, fluid forces acting on the valve plug 228 can be balanced by fluid moving through the balancing channels 254 and up to the chamber 256. More specifically, fluid in the balancing chamber 256 applies a force on the balancing diaphragm 250 toward the valve port 222 to compensate for forces applied to the valve plug 228 away from the valve port 222 due to the upstream pressure at the inlet 216 of the valve 214. The components of the balanced plug assembly 244 are therefore configured such that the force applied by the balancing diaphragm 250 is approximately opposite in direction and equal in magnitude to the force of the upstream pressure applied to the valve plug 228. This effectively eliminates any influence of the upstream pressure on the operation of the balanced plug assembly 244. As such, a more accurate control of the downstream pressure by the gas regulator 210 is achieved.

As mentioned, the actuator 212 is operatively coupled to the balanced regulator valve 214 and includes a housing 220 having an upper housing component 220a and a lower housing component 220b secured together with a plurality of fasteners, for example. The lower housing component 220b defines a control cavity 227 and an actuator mouth 234. The actuator mouth 234 is connected to a valve mouth 226 of the balanced regulator valve 214 to provide fluid communication between the actuator 212 and the balanced regulator valve 214. The upper housing component 230a defines a pressure loading cavity 225 and also houses a portion of the control assembly 217.

The control assembly 217 includes a diaphragm 224, a closing spring 230, and a piston 232 that is operatively connected to both the diaphragm 224 and a control arm 226 having the valve plug 228 operatively attached thereto. The diaphragm 224 includes an opening through which the piston 232 is disposed, and may be constructed of a flexible, substantially air-tight, material. The diaphragm 224 periphery is sealingly secured between the upper and lower housing components 220a, 220b of the housing 220. The control assembly 217 further includes an actuator stem 287 that is engaged by the control arm 226 to move the valve stem 223 and valve plug 228 between the open and closed positions as the diaphragm 224 flexes due to variations in the downstream pressure.

Pressure supplied into the loading pressure cavity 225 acts against the pressure in the control cavity 227. The pressure in the control cavity 227 is the same pressure at the outlet 218 of the balanced regulator valve 214. Accordingly, the force or pressure supplied by the actuator 212 sets the outlet pressure to a desired setpoint or control pressure for the regulator 210.

To compensate for changes in the outlet pressure during operation, a pilot regulator valve assembly 260 is operatively connected to the actuator 212. In this version, the body 262 of the pilot regulator valve assembly 260 is attached to the lower housing portion 220b of the body 220 of the actuator 212, thereby forming an integral part of the fluid regulating device 210. While the pilot regulator valve assembly 260 in this version is described as an integral part of the fluid regulating device 210, the pilot regulator 260 could alternatively be an external component piped to the actuator 210 for achieving the same function described herein.

The pilot regulator valve assembly 260 includes a pilot valve 261 and a pilot actuator 271 coupled thereto. The pilot valve 261 includes a body 262 having an inlet 264, an outlet 266, and a valve port 268 disposed between the inlet 264 and the outlet 266. In this version, the inlet 264 is in fluid communication with the inlet 216 of the balanced regulator valve 214, and the outlet 266 is in fluid communication with the control pressure cavity 225 of the actuator 212. More specifically, an inlet pressure supply line 267 connects the inlet 264 to the inlet 216 of the balanced regulator valve 214. In addition, a loading pressure supply line 269 connects the outlet 266 with the loading pressure cavity 225.

As further illustrated in FIG. 3, the pilot actuator 271 includes a control assembly 273 having a diaphragm 277, a piston 278, and a control arm 280 having a valve plug 270. The pilot actuator 271 further includes a bonnet 274 that is coupled to the body 262 of the pilot valve 261. The diaphragm 277 is disposed within the bonnet 274 and divides the bonnet 274 into a first or lower cavity 279 and a second or upper cavity 281. The second or upper cavity 281 is operatively coupled to and in constant fluid communication with the control pressure cavity 227 of the actuator 212, allowing control pressure to flow within the second or upper cavity 281 and be sensed by the diaphragm 277. So configured, a bottom surface 224*b* of the diaphragm 224 of the actuator 212 is in fluid communication with a top surface 277*a* of the pilot actuator diaphragm 277. Moreover, a top surface 224*a* of the diaphragm of the actuator 212 is in fluid communication with the outlet 266 of the pilot valve 261. Changes to the control pressure sensed by the diaphragm 277 cause the valve plug 270 to move between a closed position and an open position. Such a configuration allows the pilot regulator valve assembly 260 to accurately and precisely control and adjust the loading pressure present in the loading pressure chamber 225 of the actuator 212, and therefore also present on the top surface 224*a* of the actuator diaphragm 224, by responding to minor changes in the control or outlet pressure sensed within the second cavity 281 of the pilot actuator bonnet 274.

The bonnet 274 further includes a control spring 276 that abuts and engages bottom surface 277*b* of the diaphragm 277. An adjusting screw 283 is disposed within the bonnet 274 and engages a spring seat 285. Configured in this way, the force generated by the control spring 276 is adjustable by turning the adjusting screw 283 to raise or lower the spring seat 285.

FIG. 3 depicts the regulator 210 of the present disclosure with the valve plug 228 in its closed or lock-up positions. So configured, gas does not flow through the valve port 222 of the regulator valve 214 or through the valve port 268 of the pilot valve 261. More specifically, when demand is removed from the gas distribution system, e.g., such as when a user shuts off an appliance, pressure in the control cavity 227, and, thus, the upper cavity 281 of the pilot actuator 271 in fluid communication with the control cavity 227, increases. As a result, pressure in the second or upper cavity 281 of the pilot actuator 271 is greater than the force applied by the control spring 276 to the diaphragm 277. Thus, the diaphragm 277 is pushed down, and the valve plug 270 is moved to the left relative to the orientation of FIG. 3 to the closed position.

When the pilot valve 261 is in the closed position, the loading pressure supplied by the pilot valve 261 is stopped, and a closed configuration is achieved within the regulator valve 214. This occurs because the loading pressure, which corresponds to the pressure in the load pressure cavity 225 of the housing 220 and sensed by the diaphragm 224, is less than the force applied by the pressure in the control cavity 227 of the actuator 212. Accordingly, the diaphragm 224 and the piston 232 move up and the plug 228 moves to the right relative to the orientation of FIG. 3 and into the closed position.

When an operating demand is placed on the gas distribution system, e.g., a user begins operating an appliance such as a furnace, a stove, etc., the appliance draws gas from the outlet 218 and correspondingly the control cavity 227 of the actuator 212 and the upper cavity 281 of the pilot actuator 271, reducing the pressure that is sensed by the diaphragm 277 of the pilot actuator 271. This pressure reduction causes a force imbalance to occur between the control spring force and the pressure force on the diaphragm 277 of the pilot actuator 271, such that the control spring 276 expands and displaces the diaphragm 277 upward relative to the body 262. The displacement of the diaphragm 277 forces the control arm 280 to rotate counterclockwise, moving the valve stem 272 and valve plug 270 away from the valve port 268. This open position allows fluid to flow through the valve port 268, into the line 269 and into the load pressure cavity 225. The fluid flowing into the load pressure cavity 225 increases the load pressure being applied to the diaphragm 224.

As the pressure in the loading pressure cavity 225 increases and the pressure sensed by the control cavity side of the diaphragm 224 decreases, a force imbalance occurs between a load pressure force into the loading pressure cavity 225 and an outlet pressure force on the diaphragm 224. As a result, the diaphragm 224 moves downward relative to the housing 220, causing the piston 232 to be displaced downward as well. This causes the control arm 226 to pivot in a counterclockwise direction, allowing the actuator stem 223 and the valve plug 228 to move away from the valve port 222, and the regulator valve 214 to be opened When the downstream demand is removed from the gas distribution system, such as when the user shuts off the appliance, outlet pressure will increase and pressure in the control cavity 227 will increase. Because the control cavity 227 is in fluid communication with the upper cavity 281 of the pilot actuator 271, the increased pressure sensed by the diaphragm 277 in the upper cavity 281 moves the diaphragm 277 and the piston 278 downward relative to the housing 262, causing the control arm 280 to rotate. This drives the stem 272 and plug 270 toward the valve port 268 and reduces or ceases the flow in the pilot valve 261.

When the loading pressure supplied by the pilot valve 261 is reduced or ceased, the load pressure in the loading pressure cavity 225 decreases, and the spring 230 moves in an upward direction relative to the housing 220. As a result, the diaphragm 224 and piston 232 are forced further upward relative to the housing 220. The upward movement causes the control arm 226 to pivot in the clockwise direction, which in turn drives the actuator stem 223 and the valve plug 228 further toward the valve port 222 to reduce the fluid flow through the regulator valve 214. Under normal operating conditions, the outlet pressure will drop to approximately the actuator setpoint pressure and remain there until the downstream demand changes in a manner that causes a response from by the actuator 212.

Several benefits may be derived from implementing pilot loading and balanced trim within a regulator as described above. For example, regulators in accordance with the present disclosure may be implemented in systems where higher inlet pressures are anticipated while maintaining a high level of control and accuracy over the resulting downstream pressures. At higher inlet pressures, the force applied to the valve plug 228 by the balancing diaphragm 250 increases to prevent influence on the control assembly 222 by the upstream pressures. The regulators may also be implemented where large upstream pressure variations are expected because the balanced plug substantially eliminates outlet pressure sensitivity to input pressure variations. Consequently, the balanced regulator valve 214 allows for higher rated capacities for the regulators and higher accuracy in the regulation of the downstream pressures by the regulator. Pressure loading via the pilot regulator valve assembly 260 also allows for a higher rated capacity for the regulator. The effects of "droop" on a regulator's ability to maintain the outlet control pressure at the desired setpoint pressure are reduced by the ability of the pilot regulator valve assembly 260 to maintain a more consistent load on the diaphragm of the regulator. Moreover, the load consistency results in an increase in the accuracy of the control provided by the regulator.

While the preceding text sets forth a detailed description of numerous different embodiments of the invention, it should be understood that the legal scope of the invention is defined by the words of the claims set forth at the end of a patent claiming priority hereto. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims of the patent. For example, other fluid control devices including other regulators and control valves may also benefit from the structures and/or advantages of the present disclosure. More generally, although certain example apparatus and methods have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A fluid regulating device, comprising:
    a valve having a first inlet, a first outlet, and a first valve port disposed between the first inlet and the first outlet;
    an actuator coupled to the valve, the actuator comprising:
        a housing coupled to the valve;
        a first valve plug disposed within the valve and adapted for displacement between a closed position engaging the first valve port and an open position disposed away from the first valve port,
        a sleeve for retaining and guiding the first valve plug, the sleeve having a first sleeve part and a second sleeve part, the first sleeve part having an outer surface, the outer surface contacting an inner surface of a stem guide and the second sleeve part having a base with an outer surface disposed within the first sleeve part, such that the outer surface of the base contacts an inner surface of the first sleeve;
        a balancing diaphragm operatively connected to the first valve plug and having a first side in fluid communication with an inlet pressure at the inlet of the valve, wherein the inlet pressure applies a first force to the first valve plug in the direction of the open position, and the inlet pressure acts on the balancing diaphragm to apply a second force to the first valve plug in a direction of the closed position, the magnitude of the first and second forces being approximately equal, and the balancing diaphragm having an outer peripheral portion sandwiched between the first sleeve part and the second sleeve part;
        a first diaphragm disposed within the housing and dividing the housing into a loading pressure cavity and a control pressure cavity, the first diaphragm being operatively coupled to the first valve plug and the control pressure cavity being in fluid communication with the first outlet of the valve; and
        a control arm pivotally mounted within the housing and operatively coupling the first diaphragm to the first valve plug having the balancing diaphragm; and
    a pilot regulator valve assembly coupled to the actuator, the pilot regulator valve assembly comprising:
        a valve body having a second inlet, a second outlet and a second valve port disposed between the second inlet and the second outlet, wherein the second inlet is in fluid communication with the first inlet, and the second outlet is in fluid communication with the loading pressure cavity of the actuator housing; and
        a bonnet coupled to the body;
        a second valve plug disposed within the body and adapted for displacement between a closed position engaging the second valve port and an open position disposed away from the second valve port; and
        a second diaphragm disposed within the bonnet and dividing the bonnet into a first cavity and a second cavity, the second diaphragm being operatively coupled to the second valve plug, and the second cavity in fluid communication with the control pressure cavity of the actuator, such that a bottom surface of the first diaphragm of the actuator is in fluid communication with a top surface of the second diaphragm of the pilot regulator valve assembly, allowing both the first diaphragm of the actuator and the second diaphragm of the pilot regulator valve assembly to simultaneously sense the pressure within the control pressure cavity and the second cavity;
    such that, when pressure in the control pressure cavity and the second cavity of the bonnet simultaneously decreases, the control arm rotates in a first direction to move the first valve plug toward its open position and the balancing diaphragm continues to apply the second force to the first valve plug in the direction of the closed position equal to the first force of the inlet pressure.

2. A fluid regulating device in accordance with claim 1, wherein the first diaphragm causes the control arm to rotate in a second direction to move the first valve plug toward its closed position when the pressure in the loading pressure cavity decreases.

3. A fluid regulating device in accordance with claim 1, wherein the second cavity is in constant fluid communication with the control pressure cavity of the actuator regardless of the position of the first and/or second diaphragms.

4. A fluid regulating device in accordance with claim 1, wherein the pilot regulator valve assembly further comprises a control arm operatively coupling the second diaphragm to the second valve plug, wherein the second diaphragm causes the control arm to rotate in a first direction to move the second valve plug toward its open position when the pressure at the second cavity decreases and causes the control arm to rotate in a second direction to move the second valve plug toward its closed position when the pressure at the second cavity increases.

5. A fluid regulating device in accordance with claim 1, wherein the pilot regulator includes a control spring adjustment mechanism engaging the control spring for adjustment of a force applied by the control spring to the second diaphragm to increase and decrease a pressure provided to the second cavity of the bonnet.

6. A fluid regulating device in accordance with claim 5, wherein the control spring adjustment mechanism comprises an adjusting screw and operatively coupled to the control spring.

7. A fluid regulating device in accordance with claim 1, the balancing diaphragm further comprising an inner portion disposed opposite the outer peripheral portion, the inner portion inserted into a recess within the valve plug.

8. A fluid regulating device, comprising:
    a valve having a first inlet, a first outlet, and a first valve port disposed between the first inlet and the first outlet;
    an actuator coupled to the valve, the actuator comprising:
        a first valve plug disposed within the valve and adapted for displacement between a closed position engaging the first valve port and an open position disposed away from the first valve port,
        a sleeve for retaining and guiding the first valve plug, the sleeve having a first sleeve part and a second sleeve part, the first sleeve part having an outer surface, the outer surface contacting an inner surface of a stem guide and the second sleeve part having a base with an outer surface disposed within the first sleeve part, such that the outer surface of the base contacts an inner surface of the first sleeve;
        a balancing diaphragm operatively connected to the first valve plug and having a first side in fluid communication with an inlet pressure at the inlet of the valve, wherein the inlet pressure applies a first force to the first valve plug in the direction of the open position, and the inlet pressure acts on the balancing diaphragm to apply a second force to the first valve plug in a direction of the closed position, the magnitude of the first and second forces being approximately equal, the balancing diaphragm having an outer peripheral portion sandwiched between the first sleeve and the second sleeve, a first diaphragm operatively coupled to the first valve plug to move the first valve plug between the open and closed positions and dividing the actuator into a load pressure cavity and a control pressure cavity; and a control arm pivotally mounted within the housing and operatively coupling the first diaphragm to the first valve plug having the balanced diaphragm; and a pilot valve assembly coupled to the valve and to the actuator, the pilot valve assembly comprising:

a pilot regulator valve assembly having a second inlet and a second outlet and a second valve port disposed between the second inlet and the second outlet, with the second inlet being in fluid communication with the first inlet of the valve, and the second outlet in fluid communication with the load pressure cavity, and a pilot actuator having a bonnet and a second diaphragm disposed within the bonnet and dividing the bonnet into a first cavity and a second cavity, wherein the bottom surface of the first diaphragm is in fluid communication with a top surface of the second diaphragm, and the second cavity is in constant fluid communication with the control pressure cavity of the actuator, allowing both the first diaphragm of the actuator and the second diaphragm of the pilot regulator valve assembly to simultaneously sense the pressure within the control pressure cavity and the second cavity;

wherein the pilot valve assembly increases a fluid flow through the loading pressure cavity of the actuator when the pressure in the control pressure cavity and the second cavity of the bonnet are simultaneously less than a load pressure, causing the control arm to rotate in a first direction to move the first valve plug to the open position and the balancing diaphragm to apply a force to the first valve plug in the direction of the closed position equal to an upstream pressure force being applied to the first valve plug in the direction of the open position.

9. A fluid regulating device in accordance with claim 8, wherein the first diaphragm causes the control arm to rotate in a second direction to move the first valve plug toward its closed position when the pressure in the loading pressure cavity decreases.

10. A fluid regulating device in accordance with claim 8, wherein the second cavity is in constant fluid communication with the control pressure cavity of the actuator regardless of the position of the first and/or second diaphragms.

11. A fluid regulating device in accordance with claim 8, wherein the pilot regulator valve assembly further comprises:

a body having the second inlet and the second outlet;

a second valve plug disposed within the body and adapted for displacement between a closed position engaging the second valve port and an open position disposed away from the second valve port;

the second diaphragm operatively coupled to the second valve plug to move the second valve plug between the open and closed positions; and a control spring engaging a second surface of the second diaphragm, wherein the second diaphragm and the control spring are configured to cause the second valve plug to move toward its open position and increase the fluid flow through the second valve port when the pressure at the second cavity decreases and to cause the second valve plug to move toward its closed position and decrease the fluid flow through the second valve port when the pressure at the second cavity increases to maintain the pressure against the second surface of the first diaphragm approximately equal to the load pressure.

12. A fluid regulating device in accordance with claim 11, wherein the pilot actuator comprises a control arm operatively coupling the second diaphragm to the second valve plug, wherein the second diaphragm causes the control arm to rotate in a first direction to move the first valve plug toward its open position when the pressure at the second cavity decreases and causes the control arm to rotate in a second direction to move the second valve plug toward its closed position when the pressure at the second cavity increases.

13. A fluid regulating device in accordance with claim 11, wherein the pilot actuator comprises a control spring adjustment mechanism engaging the control spring for adjustment of a force applied by the control spring to the second diaphragm.

14. A fluid regulating device in accordance with claim 13, wherein the control spring adjustment mechanism comprises an adjusting screw operatively coupled to the control spring, wherein the force applied by the control spring to the second diaphragm is increased when the adjusting screw is rotated in a first direction and decreased when the adjusting screw is rotated in a second direction.

15. A fluid regulating device in accordance with claim 8, the balancing diaphragm further comprising an inner portion disposed opposite the outer peripheral portion, the inner portion inserted into a recess within the valve plug.

* * * * *